US006182082B1

(12) United States Patent
Tanaka et al.

(10) Patent No.: US 6,182,082 B1
(45) Date of Patent: Jan. 30, 2001

(54) METHOD AND SYSTEM FOR MANAGING OBJECT-ORIENTED DATABASE

(75) Inventors: Hitoshi Tanaka, Osaka; Satoshi Wakayama, Sakai; Takeo Maruyama, Osaka; Yoichi Yamamoto, Takatsuki; Hideo Munetika, Kobe, all of (JP)

(73) Assignees: Hitachi, Ltd., Tokyo; Hitachi Software Co., Ltd., Yokohama, both of (JP)

(*) Notice: Under 35 U.S.C. 154(b), the term of this patent shall be extended for 0 days.

(21) Appl. No.: 08/505,631

(22) Filed: Jul. 21, 1995

(30) Foreign Application Priority Data

Jul. 25, 1994 (JP) .................................................. 6-172484

(51) Int. Cl.[7] ...................................................... G06F 17/30
(52) U.S. Cl. ......................... 707/103; 707/100; 707/101; 707/102
(58) Field of Search .................................. 707/103, 102, 707/101, 100

(56) References Cited

U.S. PATENT DOCUMENTS

| 5,297,279 | * | 3/1994 | Bannon et al. ...................... 707/103 |
| 5,526,519 | * | 6/1996 | Maruyama et al. ................. 707/103 |
| 5,920,725 | * | 7/1999 | Ma et al. ............................. 395/712 |
| 6,091,895 | * | 7/2000 | Govindaraj ......................... 395/702 |

OTHER PUBLICATIONS

Jones et al. "The OKS persistent in memory object manager" IEEE transactions on nuclear science, vol. 45, No. 4, pp. 1958–1964, Aug. 1998.*

Goto et al., "A deductive objected language for Integrated", IEEE, pp. 108–109, 1994.*

Urban et al., "The implementation and evaluation of integrity Maintenance Rules in an object–oriented database", IEEE, pp. 565–572, 1992.*

* cited by examiner

Primary Examiner—Hosain T. Alam
Assistant Examiner—Jean M. Corrielus
(74) Attorney, Agent, or Firm—Antonelli, Terry, Stout & Kraus, LLP

(57) ABSTRACT

A system for managing an object-oriented database in response to a request issued from an application program includes a database for storing therein both of a class having a definition of an object and an object generated from the class; a generating unit for generating a class and a plurality of attributes based on class definition information and attribute definition information, which are designated by the application program; another generating unit for generating an object to store an attribute value corresponding to the class definition information in accordance with the class definition information, the object generating unit including a-storage control unit for storing the attribute value related to a normal attribute into one storage unit area of the database when the request issued from the application program is related to the normal attribute, and for storing the attribute value related to a clustering attribute into another storage unit area of the database when the request issued from the application program is related to a clustering attribute; and acquiring unit for acquiring information corresponding to an identifier of an attribute required by the application program from any one of the one storage unit area and the another storage unit area, and for storing the acquired information into a memory area.

16 Claims, 9 Drawing Sheets

METHOD AND SYSTEM FOR MANAGING OBJECT-ORIENTED DATABASE

BACKGROUND OF THE INVENTION

The present invention relates to a database management system, more specifically, to a technique suitably applied to an object-oriented database management system.

It should be noted that the present invention is related to the co-pending U.S. pat. application Ser. No. 08/038, 634, entitled "OBJECT MANAGEMENT SYSTEM" filed by T. Maruyama et al., on Mar. 29, 1993, now pat. no. 5,526,519.

In the conventional object-oriented database management system, an object corresponds to a data set containing an object identifier for exclusively indicating the object, a length of the object, the attribute number, attribute information, attribute data, and an offset for storing attribute data.

As to the above-described technique, Wom Kim; "Introduction to Object-Oriented Database", The MIT press, 1992, pages 107 to 114 describes such an object, class, instance and clustering.

Then, in the conventional object-oriented database management system, the database is subdivided into several physical regions called as "partitions", a plurality of segments each containing several storage regions referred to "pages" are formed on each of these partitions, and such objects under one relationship are stored in one of these storage regions for management purpose, paying attention to a plurality of objects having a common attribute, a plurality of objects belonging to the different class and having the common attribute, or a part of an object.

Normally, an object having either the common attribute, or a dependent attribute with respect to the data about one attribute of the object, the attribute defining one character of the object, stored in the same storage region can be read out with one accessing operation together with the one attribute, giving a merit in performance.

The Applicants of the present invention could find out the following problems by investigating the above-described prior art.

That is, the above-mentioned prior art does not consider to obtain data of one or a plurality of selected common attributes among a plurality of objects within one time. In order to acquire the data with one attribute of the plural objects within one time, all of these plural objects arranged at the physically adjacent locations are first acquired, and then the attribute data should be selected in accordance with the offset of the attribute data and the attribute information owned by the object.

SUMMARY OF THE INVENTION

An object of the present invention is to provide a technique capable of acquiring a data portion selected from data about attributes of a class.

Another object of the present invention is to reduce an overhead for acquiring a portion of attribute data, after obtaining data of whole objects, in accordance with attribute information of each object.

The above-described objects and other objects and also novel features of the present invention will be apparent from the description of this specification and the accompanying drawings.

A system for managing an object-oriented database in response to a request issued from an application program, comprising:

a database for storing therein both of a class having a definition of an object and an object generated from said class;

means for generating a class and a plurality of attributes based on class definition information and attribute definition information, which are designated by the application program;

means for generating an object storing therein an attribute value corresponding to said class definition information in accordance with said class definition information, said object generating means including a storage control unit for storing the attribute value related into one storage unit area of said database when the request issued from the application program is related to a normal attribute, and for storing the attribute value related to said clustering attribute into another storage unit area of said database when the request issued from the application program is related to a clustering attribute; and means for acquiring information corresponding to an identifier of an attribute required by the application program from any one of said one storage unit area and said another storage unit area, and for storing the acquired information into a memory area.

An attribute value corresponding to the identifier of the attribute required by the application program will be acquired by the application program.

Such an object-oriented database management system may be constructed which comprises a class having a definition of an object, a database for storing therein an object generated from this class, a management means for managing the database, an dictionary service unit for managing the object and the definition information about the attribute data; the storage control unit for storing either the attribute data for each of the same classes from the definition information, or the attribute data common to the plural classes into the same storage area within the database; and the object management unit for deriving this attribute data from the storage control unit in the same storage region unit and for transferring the derived attribute data to the application program within one accessing operation.

According to the above-described arrangement, in the object-oriented database management system, there are provided the dictionary service unit for managing the object and the definition information about the attribute data; the storage control unit for storing either the attribute data for each of the same classes from the definition information, or the attribute data common to the plural classes into the same storage area within the database; and the object management unit for deriving this attribute data from the storage control unit in the same storage region unit and for transferring the derived attribute data to the application program within one accessing operation. When the attribute data of the class is acquired within one accessing operation, it is no longer required that all of the objects are acquired, and then the attribute data is acquired in accordance with the attribute information owned by the object and also the offset of the attribute data. In other words, since the data stored in the same storage area is merely acquired, all of the attribute data about the object of the class within the database can be acquired at once. Accordingly, the attribute data acquisition efficiency can be increased.

DESCRIPTION OF THE PREFERRED EMBODIMENTS

Figure 1:
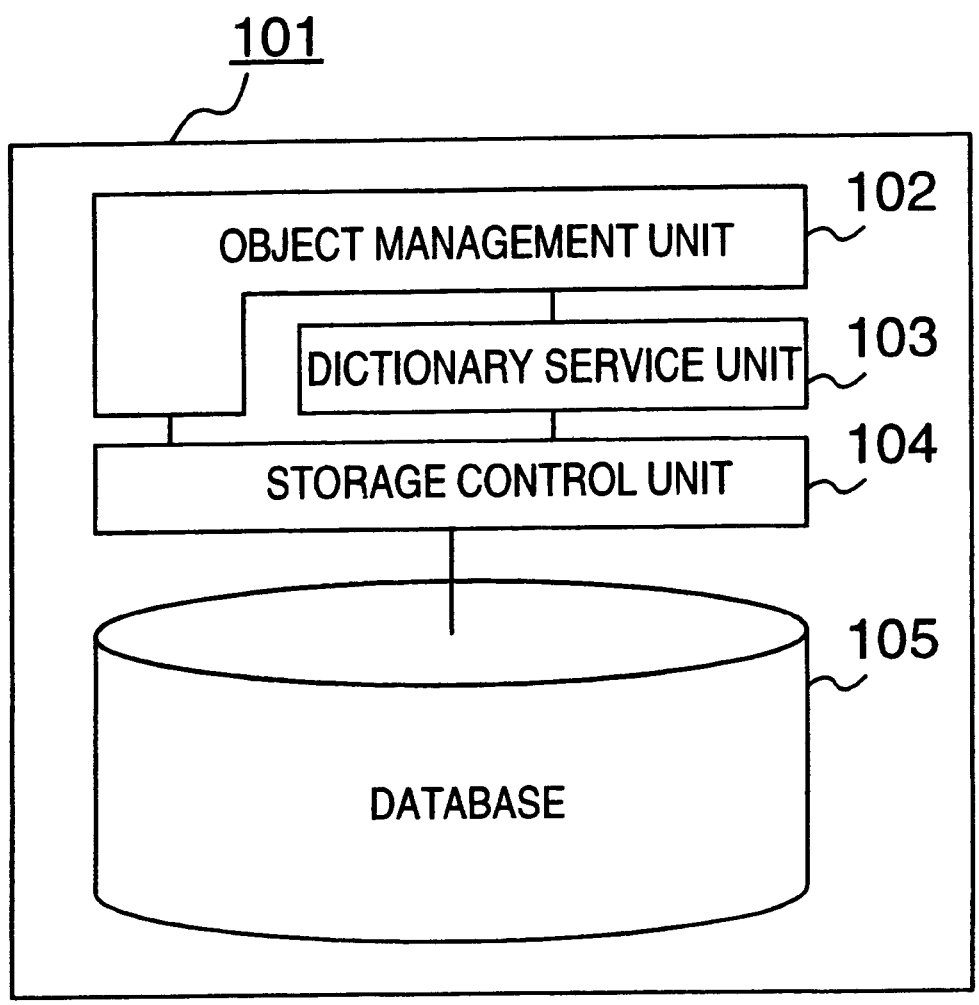
FIG. 1 explanatorily shows an arrangement of an object-oriented database management system according to an embodiment of the present invention.

Referring now to FIG. 1 to FIG. 6, an object-oriented database management system according to an embodiment of the present invention will be described. It should be noted that the same reference numerals will be employed as those for indicating components having the same functions in all of the following drawings used to explain an embodiment, and descriptions thereof are not repeatedly made.

FIG. 1 is an explanatory diagram for showing an arrangement of an object-oriented database management: system according to one embodiment of the present invention.

In FIG. 1, reference numeral 101 indicates an object-oriented database management system, reference numeral 102 denotes an object management unit, reference numeral 103 shows a dictionary service unit, reference numeral 104 represents a storage control unit, and reference numeral 105 is a database. It should be understood that these components 102, 103, 104 may be realized by a program run on a CPU.

The object management unit 102 accepts an operation request of an object externally supplied from an application program, acquires attribute information (information to define attribute) having a variable length structure and information about a class, which are supplied from the dictionary service unit 103, and operates the object while referring to these class information and attribute information. The dictionary service unit 103 manages the class information and attribute information. The storage control unit 104 stores this class information and the object into the database 105, and also derives the class information and the object from this database 105. The database 105 stores therein the class information and the object.

A structure of a class stored/managed in/by the object-oriented database management system according to this embodiment will now be described more in detail with reference to FIG. 2.

Figure 2:
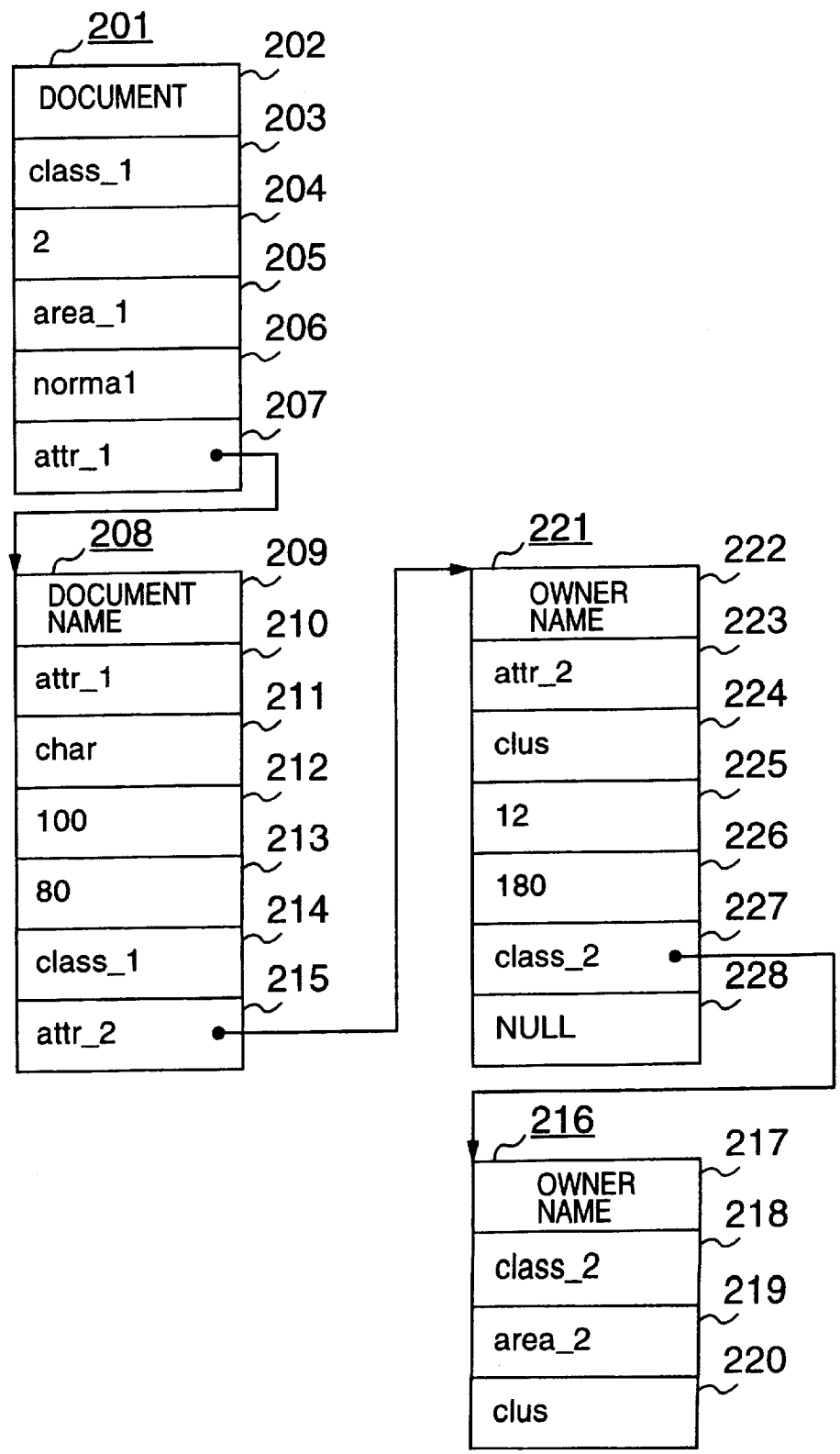
FIG. 2 explanatorily represents a structure of a class stored/managed in the database of the object oriented database management system according to this embodiment.

FIG. 2 is an explanatory diagram for explaining a definition on the structure of the class in this embodiment. It should be understood in this FIG. 2 that there are represented a class corresponding to one document, a title of this document and a name of an owner, which are attributes of this class. Also, only such an attribute as "a name of an owner" from these two attributes is stored in one storage reading unit (page, or segment) area within the database. Another class 216 for defining a name of an owner (will be referred to a "clustering information class" hereinafter) is illustrated.

In FIG. 2, reference numeral 201 shows a class, reference numerals 208 and 221 represent attributes, and reference numeral 216 denotes a clustering information class.

As illustrated in FIG. 2, the class 201 according to this embodiment is arranged by a class name 202 indicative of a title of a class, a class identifier 203 for exclusively indicates the class within the system, an attribute number 204 representative of the number of attributes defined in the class, and an area identifier 205 for exclusively indicating a storage area within the database for storing therein an object (will be discussed) generated from this class within the system. This class 201 is further constructed of a class sort 206 by which this class indicates either a definition of a class for storing attribute data having a variable length structure (will be explained later) into another storage unit area within the database (will be referred to "clustering" hereinafter), and an attribute identifier 207 for exclusively indicating attribute definition information for defining an attribute 208 (will be explained later) within the system.

The definition information within the attributes 208 and 221 is arranged by attribute names 209, 222 for indicating names of attributes; attribute identifiers 210, 223 for exclusively representing these attributes within the system; data 211, 224 for showing models of attribute data; and lengths 212, 225 for indicating lengths of this data, respectively. The definition information within the attributes 208, 221 is further constructed of offsets 213, 226 from the head, for storing attribute data within the object; a class identifier 227 for a class for clustering either the cluster identifier 203, namely 214 of this class used to define the class, or data about this attribute 221; and attribute identifiers 215, 228 for representing the next attribute in the case that this class is arranged by a plurality of attributes.

A clustering information class 216 is constructed of a class name 217 for indicating a name of the class 216 of the attribute 221 in which clustering is carried out; a class identifier 218 for exclusively identifying this class within the system; an area identifier 219 for exclusively representing a storage area within the database, which stores data in an attribute generated from this class; and a class sort 220 for identifying that the class corresponds to the clustering information of this attribute.

The document class 201, the document name attribute 208, and the owner name attribute 221 are definited by the application program, whereas the owner name clustering information class 216 is generated by the system 101 which has received the request issued from the application program.

The above-explained structure of the class will now be concretely explained with using FIG. 2. The document class 201 is arranged by "document" as the class name 202; "class_13 12" as the class identifier 203; "2" as the attribute number 204; and "area_1" as the area identifier 205. This document class 201 is further arranged by "normal" for indicating that the class sort 206 is not equal to the clustering information; and "attr_1" as the attribute identifier 207 of the attribute owned by this document class 201. An attribute with respect to the document class 201 corresponds to the document name attribute 208 and the owner name attribute 221.

This document name attribute 208 is constructed of "document name" as the attribute name 209; "attr_1" as the attribute identifier 210; "char" indicative of a character string as the model 211; "100" as the length 212; "80" as the offset 213; "class__1" as the class identifier 214 indicative of the class having this document name attribute 228; and "attr__2" as the attribute identifier 215 for indicating the attribute owned by this document class 201.

The owner name attribute 221 is constructed of "owner name" as an attribute name 222; "attr__2" as an attribute identifier 223; "clus" by which a model 224 represents an attribute of a clustering information class with a variable length structure stored into the same storage region within the database; "12" as a length 225; "180" as an offset 226; "class__2" as a class identifier 227 of a class for defining the clustering information; and "NULL" by which the attribute identifier 215 indicative of the attribute owned by this document class 208 indicates that there is no next attribute present therein.

The clustering information class 216 about the owner name of this owner name attribute 221 is arranged by an owner name as the class name 217; "class__2" as the class identifier 218, "area__2" as the area identifier 219; and "clus" as the class sort 220.

Next, a description will now be made of a sequence for generating an object with attribute data having a variable length structure in another storage area as an instance produced from the document class shown in FIG. 2, with reference to FIG. 3.

Figure 3:
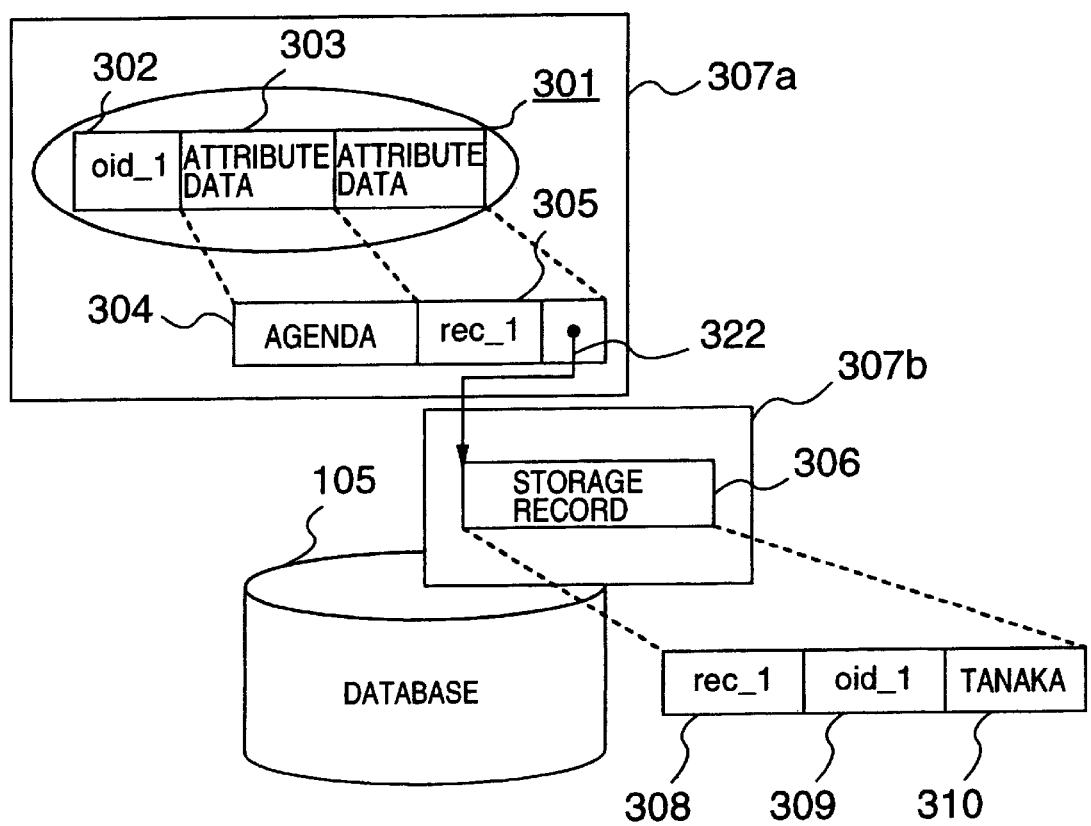
FIG. 3 explanatorily illustrates a structure of an object having data about an attribute with a variable length structure, according to this embodiment, within the same storage region.

In FIG. 3, an object 301 stored in the database employed in the system is constructed of an object identifier 302 for exclusively identifying this object 301 within the system, and data 303 containing an agenda attribute and an owner attribute, stored in accordance with the class. These attribute data are arranged by a document name and an owner name from the above-described document class structure as indicated in FIG. 2.

Here, as also represented in the class structure of FIG. 2, attribute data 305 of the document name (agenda 304 in FIG. 3) is not clustered, but is stored into a single storage reading unit 307a, and only attribute data 305 of the owner name is clustered by employed a pointer, as illustrated by an arrow 322, thereby to be stored into a storage area 307b.

The attribute data 305 of the owner name which has been defined as an attribute to be stored into one storage reading unit 307b (e.g., page) within the database 105, owns a storage record identifier 308 (will be discussed later).

Then, the storage record 306 stored in this storage area 307b is constructed of a storage record identifier 380 indicative of the storage position within this storage area 307; an object identifier 309 of this object 301 having this data; and data 310 about this owner name.

Within the object 301 where the object identifier 302 is "oid__1", the data 303 on the attribute has the variable length structure. In other words, while referring to the record identifier 302 of the attribute data 305 of the owner name in this object 301, both of the storage area 307b within the database 105 and the storage position of the storage record 306 are acquired from this record identifier 308, so that "TANAKA" corresponding to the owner name data 310 of this attribute owned by this storage record 306 can be acquired.

The storage record 306 owns "oid__1" corresponding to the object identifier 309 of the object 301 having the owner name data 310 as the attribute of this storage record 306. While referring to this object identifier 309 from the storage record 306, this object 301 can be acquired.

Before describing the above-described process method for acquiring the attribute data having the variable length structure stored in the same storage region, a sequence for defining a class will now be explained.

Figure 4A:
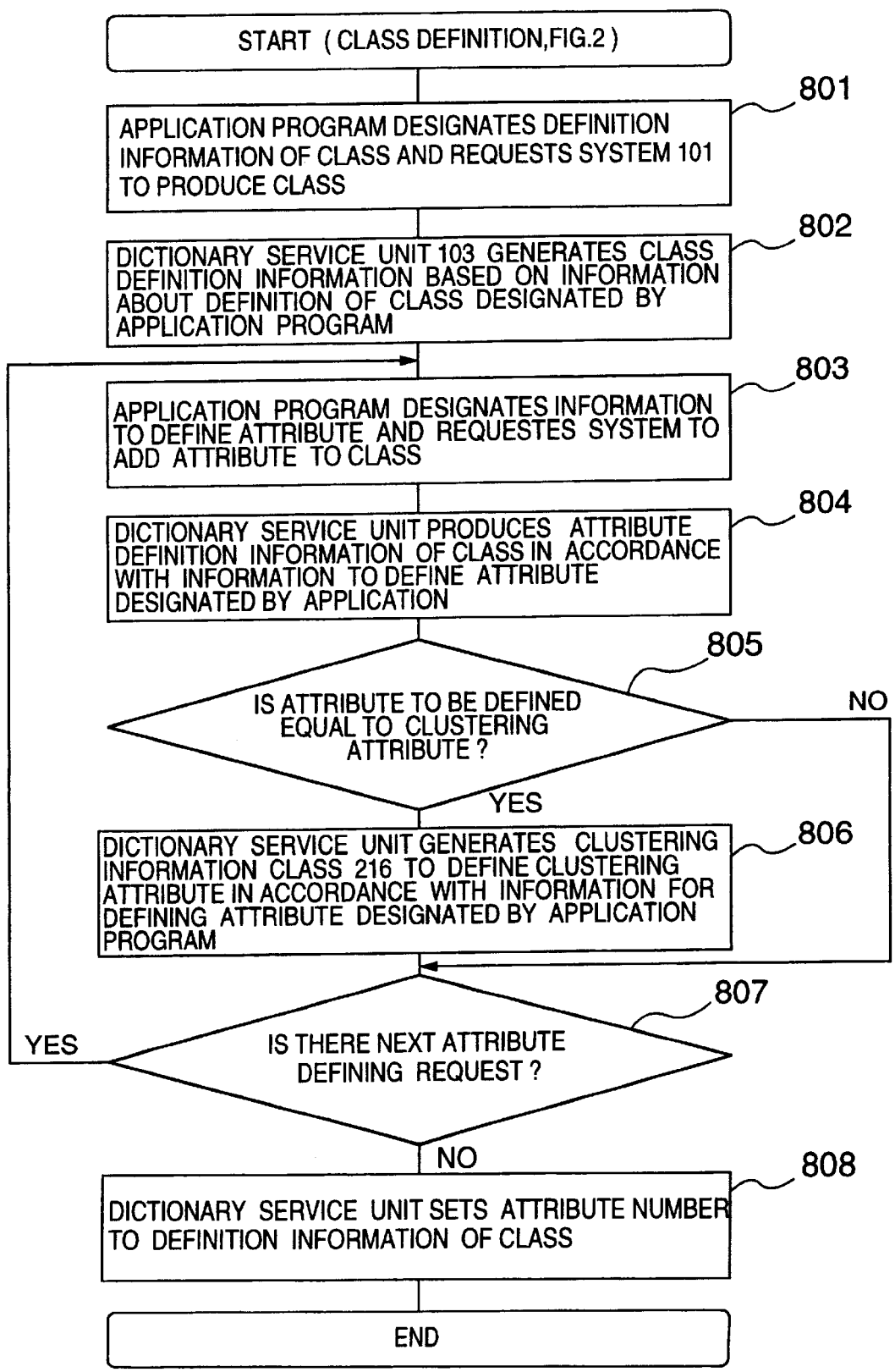
FIGS. 4A to 4C are flow charts for indicating such a process operation that an application program acquires data about attributes within one time in accordance with this embodiment.

FIG. 4A is a flow chart for explaining a sequence to define a class by an application program. Now, this flow chart will be described by employing the above-explained class definition.

The application program designates the area identifier 205 for storing the object generated from the class name 202 and the class 201, and issues a class generation request to the object-oriented database management system (will be simply referred to a "system") (step 801).

The dictionary service unit 103 produces class definition information 201 used to set/define the class name 202, the class identifier 203, the class identifier 205, and the class sort 206 in accordance with information for defining the class designated by the application program (step 802).

The application program designates information for defining the attribute in order to add the attribute to this class 201, and requests to add the attribute to this class 201 (step 803).

The dictionary service unit 103 generates such attribute information arranged by the attribute names 209, 222; the attribute identifiers 210; 223; the types of attributes 211, 224; the lengths of attributes 212, 225; the offsets 213, 226; and the class identifiers 214, 227 in accordance with the information for defining the attribute designated by the application program (step 804).

When the clustering information of the attribute corresponds to the clustering designation of the attribute, information for clustering the attributes is generated (step 805).

The dictionary service unit 103 produces the attribute clustering information class 216 constructed of the attribute name 217, the class identifier 218 for clustering the attribute, the area identifier 219, and the clustering sort 220 in accordance with the attribute information designated by the application program (step 806).

This process operation is repeatedly performed until the processes for the attributes designated by the application program are completed (step 807).

The number of attribute definitions to the class by the application program is set to the class definition information 204, so that the definition of the class is ended (step 808).

Figure 4B:
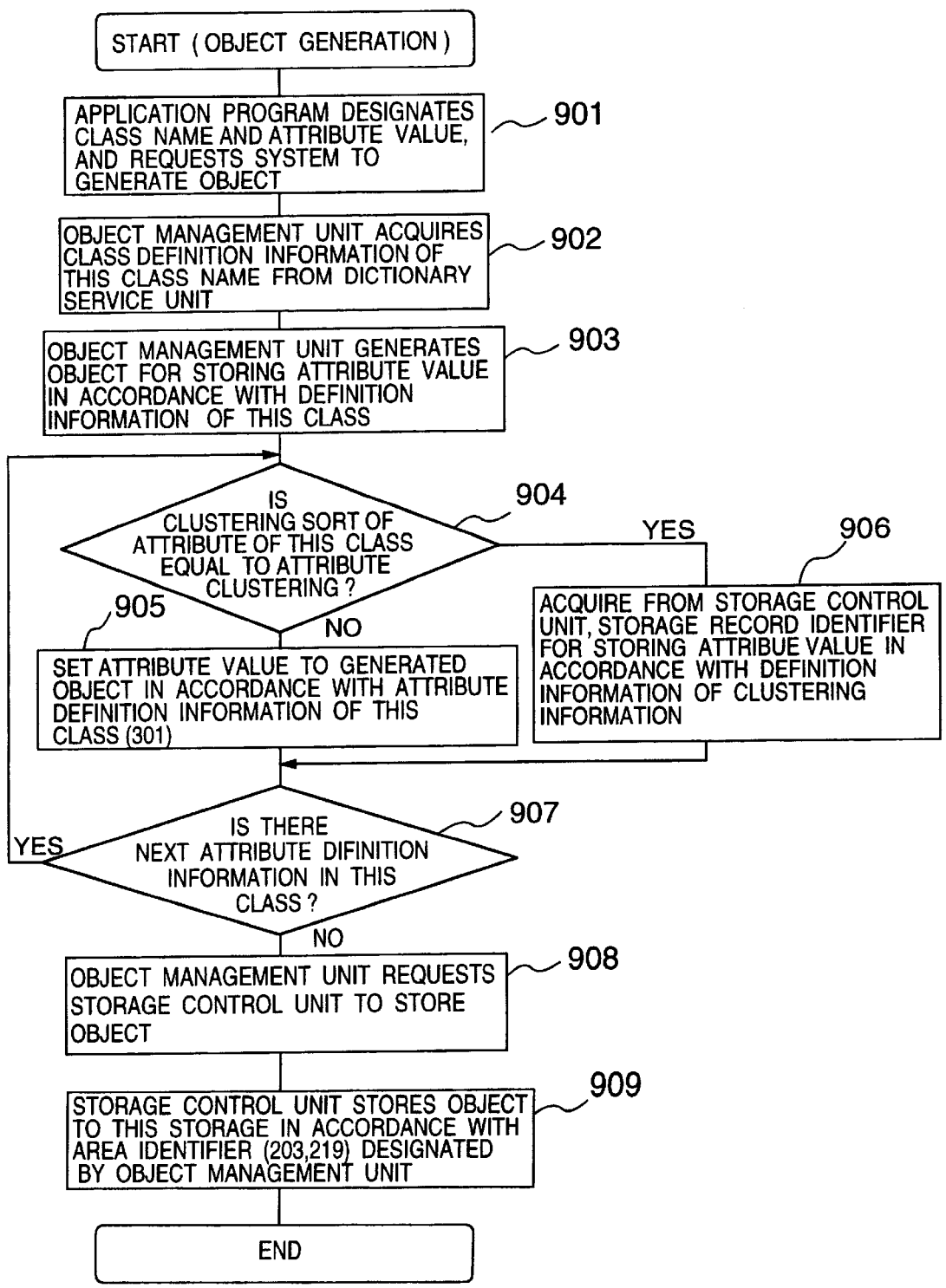

FIG. 4B is a flow chart for explaining that the application program generates an instance of a class. This flow chart will now be described with employment of the above-described object having the definition of the class and the attribute of the variable length structure.

In this flow chart, the application program designates the class name 202 of the class for requesting a data acquision by the application within one accessing operation and one of plural attribute values, and further requests to generate a new object used to the data acquision within one accessing operation (step 901). The object management unit 102 acquires the class definition information 201 based on the class name 202 from the dictionary service unit 103 (step 902).

The object management unit 102 produces a new object 301 used to set the attribute value in accordance with the dictionary service unit 103, and attaches the object identifier 302 to this new object 301. This new object is such useful data not containing the attribute which is not requested by the application program (step 903).

When the types 211, 224 of the attribute definition information 208, 221 of this class corresponds to the attribute clustering, the process of the attribute clustering is carried out (step 904).

The object management unit acquires the storage record identifier 305 indicative of the attribute value to be clustered from the storage control unit 104, and then sets this storage record identifier 305 to this object 301 in the case that the types 211, 224 of this attribute definition information 208, 221 correspond to the attribute clustering (step 906).

To the contrary, when the types 211, 224 of the attribute definition information 208, 221 of this class do not correspond to the attribute clustering, the object management unit sets the attribute value as the attribute data 304 of this object 301 in accordance with this attribute definition information 208 (step 905).

This process operation is repeated as long as the attribute definition information 208, 221 of this class 201 is present (step 907).

The object management unit 102 requests the storage control unit 104 to store the object 301 into the database 105 (step 908).

The storage control unit 104 stores the object 301 into the database 105 in accordance with the area identifiers 205, 219 of the class definition information 201 designated by the object management unit 102 (step 909).

Figure 4C:
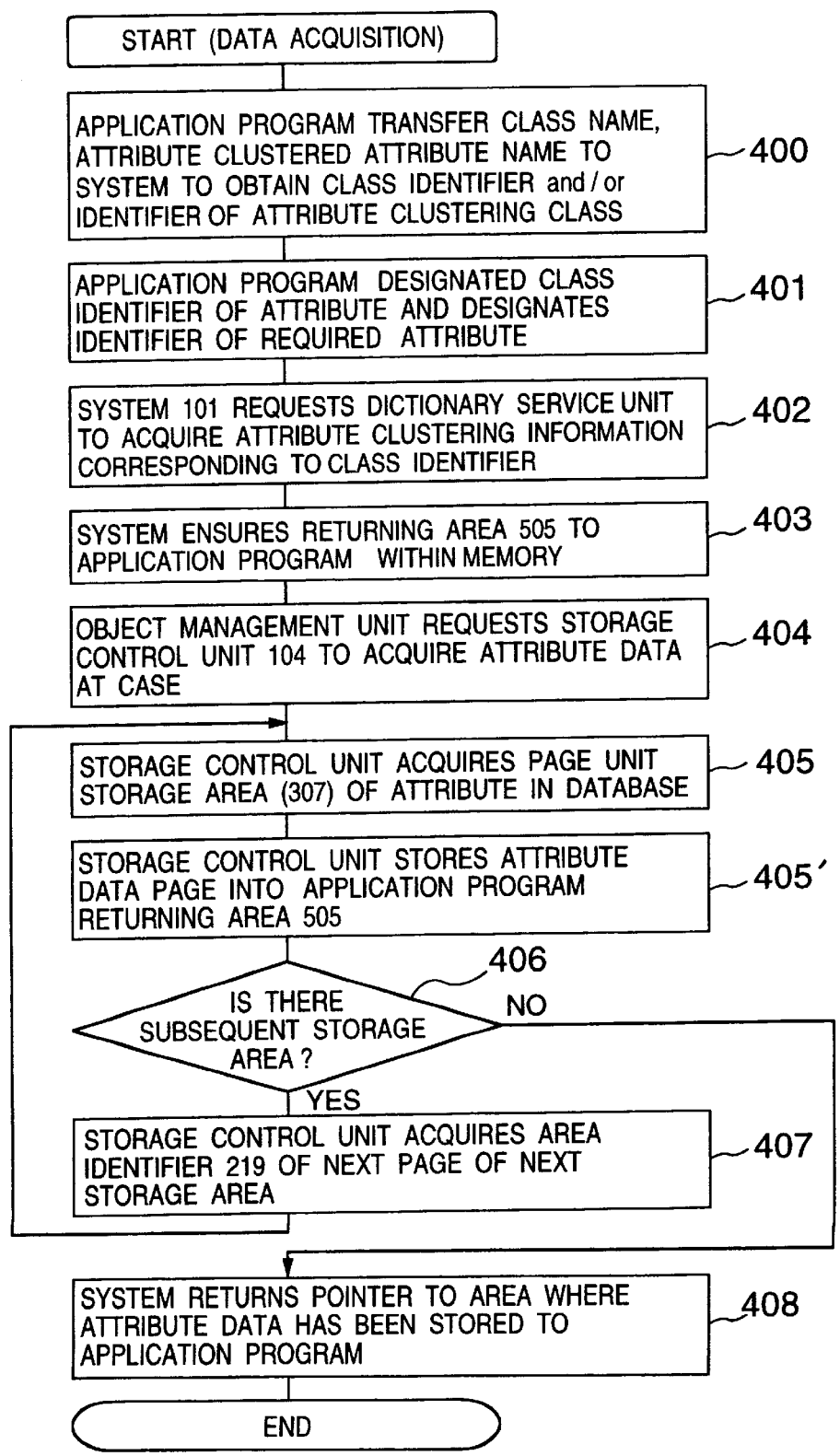

FIG. 4C is a flow chart for representing a process sequence to acquire data on an attribute requested by an application program within one accessing operation.

As indicated in FIG. 4C, in accordance with the process sequence to acquire the data about the attribute of this embodiment, first, the application program transfers the name of the class (clustering information class) for defining the attribute stored in the same storage area within the database, and also the name of the attribute for performing the attribute clustering to the system (step 400). The application program accepts the class identifier for exclusively identifying the class within the system, and then designates this class identifier to the object management unit. Then, the attribute identifier (223) of the attribute required by the application program is designated to request that the data are acquired by the application program within one accessing operation (step 401).

The object management unit designates the class identifier designated by the application program with respect to the dictionary service unit, so that the acquisition of the clustering information about this attribute is required, whereas the dictionary service unit returns the clustering information containing the class identifier of this attribute to the object management unit (step 402).

The object management unit acquires on the memory, such an area used to return the data stored in this storage area obtained by this class identifier to the application program within one accessing operation (step 403).

Then, the object management unit designates both of the area identifier stored in the clustering information of this attribute and the area acquired on the memory, and requests the storage control unit to acquire the data on this attribute within one accessing operation (step 404).

The storage control unit acquires the data of this attribute corresponding to the area identifier designated by the object management unit from the database in the storage area unit within the database (step 405), and stored this attribute data in this area acquired on the memory (step 405').

In the case that the data cannot be stored into a single storage area in which this attribute data has been stored, but are stored in a plurality of storage regions, the storage control unit returns the area identifier of the storage area subsequent to this storage area at a step 407 to the object management unit (step 406).

The request for acquiring the storage control unit to store the attribute data into the storage region, in that the object management unit establishes the area for storing the subsequent storage area on the memory, and the storage control unit designates the returned area identifier and this region on the memory at the step 405, is carried out until all of the storage areas for the attribute data have been acquired.

In the case that all of the storage areas for the attribute data have been acquired at the step 406, the object management unit returns this area acquired on the memory to the application program at a step 408, that the attribute data is acquired and the process operation is accomplished. In this manner, the application program can acquire such attribute data which are neither shortage, nor over, and thus the loads related to the post processing operation of the data can be eliminated.

Figure 5:
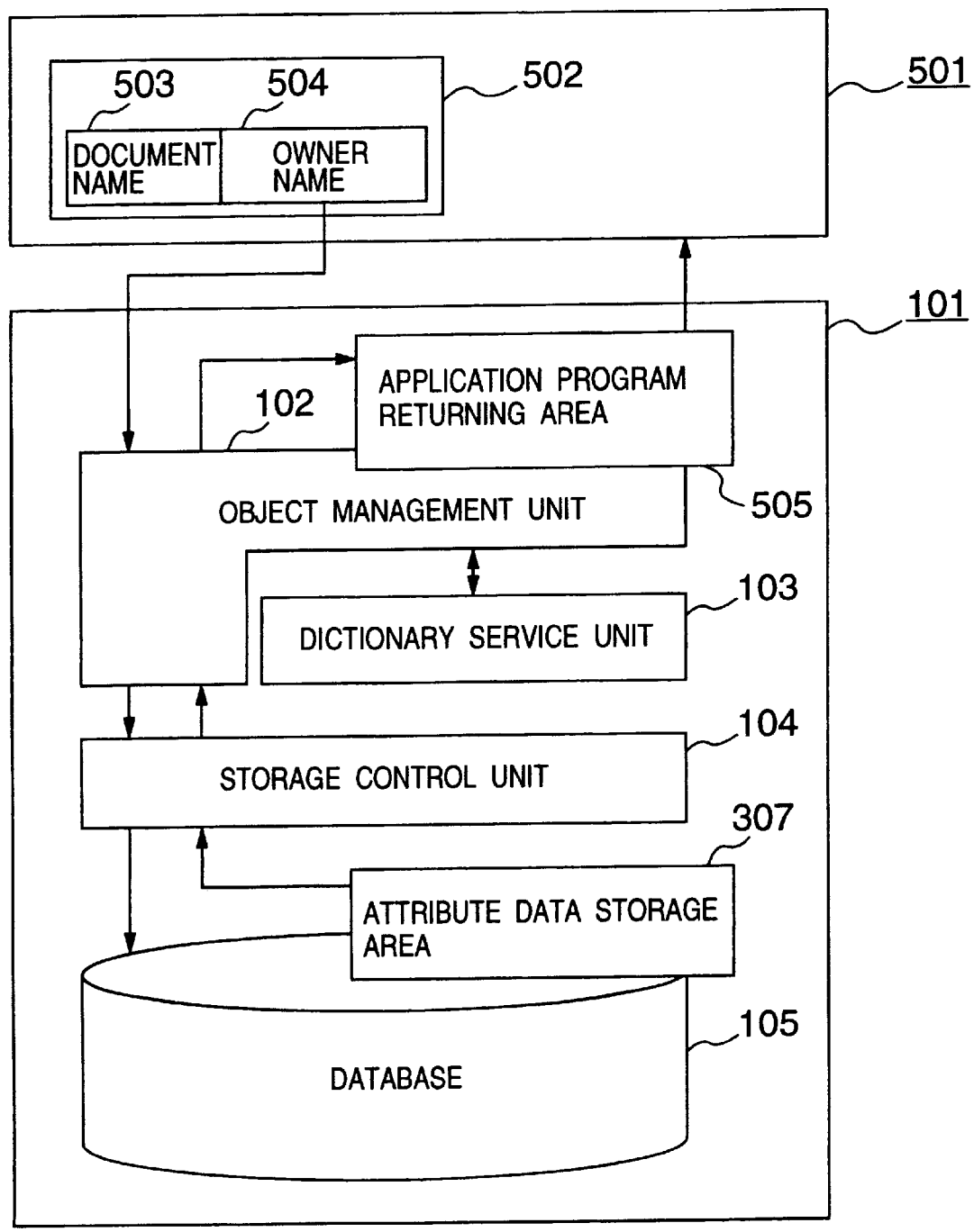
FIG. 5 explanatorily indicates such an acquiring process method that the application program acquires the data about the attributes with the variable lengths structures within one time, which are stored into the same storage area within the database in accordance with this embodiment.

Referring now to FIG. 2, FIG. 4C and FIG. 5, a concrete description will be made of an acquisition processing method for acquiring the attribute data having the variable length structure, which is stored in the same storage area within the database by the application program.

In FIG. 5, reference numeral 501 denotes an application program, reference numeral 502 shows a document class, reference numeral 503 represents an attribute of a document name, reference numeral 504 is an attribute of an owner name, and reference numeral 505 indicates an application program returning region.

As shown in FIG. 5, the application program 501 owns the above-described document class 502. The document class 502 is arranged by the document name attribute 503, and the owner name attribute 504 for defining the attribute to be stored in the same storage area within the database.

As indicated in FIG. 4C, the application program designates the class identifier of this owner name attribute 504 among two attributes of this document class 502 into the object management unit 102 owned by the object-oriented database management system 101 according to this embodiment, so that the data on this owner name attribute 504 is acquired (step 401).

The object management unit 102 designates this class identifier designated by the application program 501 with respect to the dictionary service unit 103, thereby requesting to acquire the clustering information of this owner name attribute 504. The dictionary service unit 103 returns the clustering information of the attribute (data of clustering information class 216) having the class identifier of this owner name attribute 504 to the object management unit 102 (step 402).

The object management unit 102 acquires an area 505 on the memory, which is to return the data on this owner name attribute 504 to the application program 501 (step 403).

Then, the object management unit 102 designates both of the area identifier 219 stored in the clustering information class 216 of this owner name attribute 504 and this area 505 acquired on the memory, and requests the storage control unit 104 to acquire the data about this owner name attribute 504 in the storage area unit within the database (step 404).

The storage control unit 104 acquires from the database 105, the storage area 307 for storing therein the data on this attribute corresponding to the area identifier 219 designated by the object management unit 102, and stores this attribute data into the area 505 acquired on the memory, and then returns this attribute data to the object management unit 102 (step 405).

In such a case that the data cannot be stored into the single storage area 307 for storing therein the data about the owner name attribute 504, but are stored into a plurality of storage areas, at a step 407, the storage control unit 104 returns an area identifier of a storage area subsequent to this storage area 307 to the object management unit 102 (step 406).

The object management unit 102 repeatedly performs the process operations defined from the step 405 to the step 407 until all of the subsequent storage regions are acquired.

When there is no subsequent storage area at the step 406, the object management unit 102 accomplishes the acquisition process by that the storage control unit 104 returns the area 505 on the memory for storing this storage area 307 to the application program 501.

It should be noted that the above-described embodiment has described only such a case that the attribute data in the same class is stored into the same storage area within the database and is managed as a single clustering information class. Alternatively, according to the present invention, the above-described management method may be similarly applied to even such a case that attribute data commonly used for plural classes may be stored in the same storage area within the database as the clustering information class for management purpose, since the capacity of the database is effectively utilized.

The object-oriented database management system is comprised of the dictionary service unit for managing the object and the definition information about the attribute data; the storage control unit for storing either the attribute data for each of the same classes from the definition information, or the attribute data common to the plural classes into the same storage area within the database; and the object management unit for deriving this attribute data from the storage control unit in the same storage region unit and for transferring the derived attribute data to the application program within one accessing operation. As a consequence, it is no longer required that all of the objects are acquired, and then the attribute data is acquired in accordance with the attribute information owned by the object and also the offset of the attribute data. In other words, since the data stored in the same storage area is merely acquired, all of the attribute data about the object of the class within the database can be acquired at once. Accordingly, the attribute data acquisition efficiency can be increased.

Figure 6A:
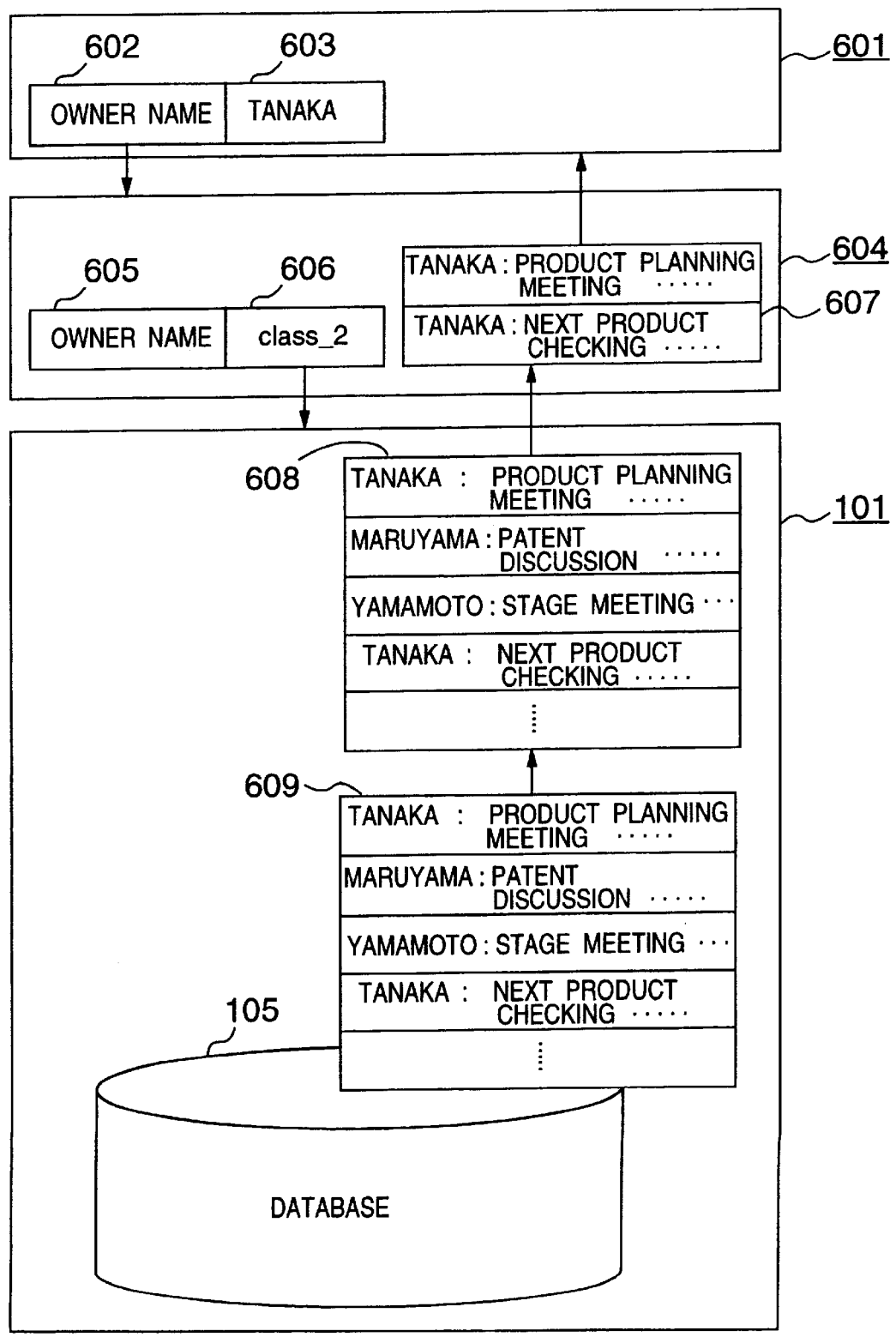
FIGS. 6A and 6B are explanatory diagrams for explaining such a case when attribute data of the database in the object-oriented database management system according to the present invention is retrieved with using the user application program.
Figure 6B:
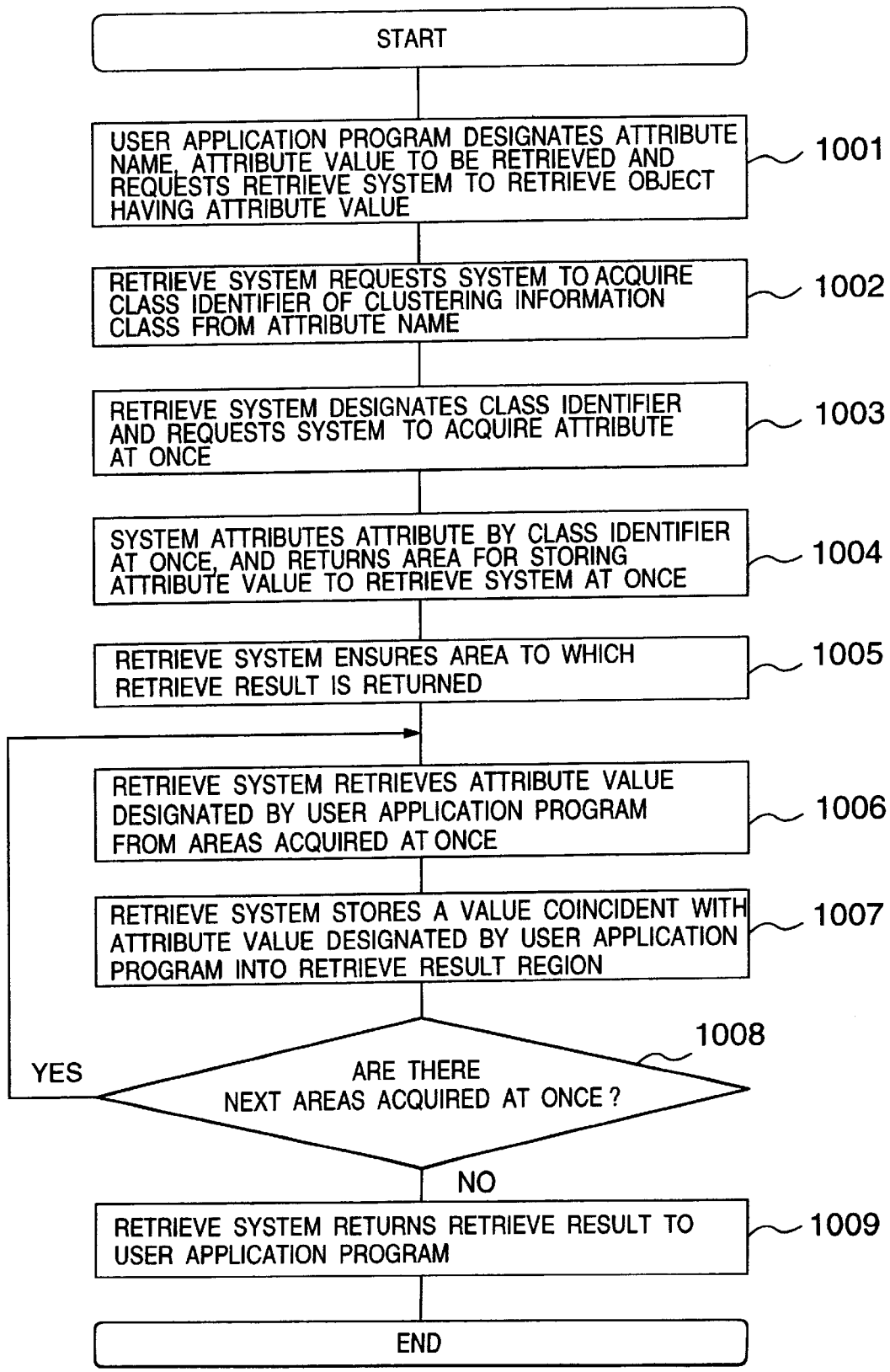

Finally, FIGS. 6A and 6B represent an example when the attribute data of the database employed in the object-oriented database management system according to the present invention is retrieved by employing such a user application program having no means for acquiring the attribute data with the variable length structure within one accessing operation, which is stored into same storage area in the database.

In FIG. 6A, reference numeral 601 indicates a user application program, and reference numeral 604 shows a retrieve system.

As shown in FIG. 6A, the user application program 601 can retrieve the database of the object-oriented database management system according to the present invention by providing a retrieve system including means for acquiring the attribute data with the variable length structure within one accessing operation, stored in the same storage region in the database, between this user application program 601 and the database of this object-oriented database management system 101.

This retrieving method will now be explained.

First, as attribute data retrieved by the user application program 601, a name of an owner is designated as an attribute name 602 indicative of a name of an attribute, and "TANAKA" is designated as a retrieve word 603. To a retrieve system 604 (will be discussed later), a retrieve operation of such attribute data containing the owner name as this attribute name 602 and "TANAKA"as this retrieve word 603 is requested.

Then, the retrieve system 604 acquires a class identifier 606 of this attribute name 605 having this retrieve word 603 as the data, designates "class_2" corresponding to this class identifier 606, and requires the object-oriented database management system 101 according to the present invention to acquire the attribute data within one accessing operation.

Then, the object-oriented database management system 101 acquires the data about this attribute name 605 in the unit of the storage region 609 from the database 105 based on this class identifier 606, stores the acquired data into the area 608 acquired on the memory, and then returns the area 608 acquired on the memory to the retrieve system 604 within one accessing operation.

The retrieve system 604 retrieves the data about this acquired storage region 608 based upon the retrieve word 603 designated by this user application program 101, and performs the retrieve operation by returning the attribute data 607 having the retrieve word 603 to the user application program 601.

As described above, since such a system is employed which owns the means for acquiring the attribute data with the variable length structure at once, stored in the same storage area within the database, the object-oriented database management system according to the present invention may be utilized by even such a simple application program. Also, this object-oriented database management system may be utilized without changing the conventional user application programs.

FIG. 6B is a flow chart for showing an operation sequence to retrieve an attribute value by the user application program with using a retrieve system. Now, the flow chart will be explained by using the above-described retrieve system.

The user application program 601 designates the attribute name 602 and the attribute value 603, and requests the retrieve system 604 to retrieve the data having the attribute value 603 (step 1001). The retrieve system 604 designates the attribute name 605 to the system 101, thereby requesting the acquisition of the class identifier 606, and this system 101 returns the class identifier 606 corresponding to this class name 605 to the retrieve system 604 (step 1002).

The retrieve system 604 designates this class identifier 606, and requests the system 101 to acquire the attribute name 605 within one accessing operation (step 1003). The system 101 acquires the attribute value designated by the class identifier 606 in the unit of the stored area 609, stores the acquired attribute value into the area 608 ensured on the memory, and then returns the attribute value to the retrieve system within one accessing operation (step 1004).

The retrieve system 604 ensures on the memory, the area 607 for returning the retrieve result tot he user application program 601 (step 1005). The retrieve system 604 retrieves the data containing the attribute value 603 designated by the user application program 601 from the area 608 in which the attribute value acquired within one accessing operation has been stored. The retrieve system 604 stores this data into the area 607 for returning the retrieve result (step 1007).

Since the system 101 returns the retrieve result to the retrieve system 604 in the unit of storage area 608, the retrieve system repeatedly performs the above-described process operation as long as this area 608 is present (step 1008). The retrieve system 601 returns the area 607 into which this retrieve result has been stored to the user application program 601 (step 1009 ).

While the present invention has been described in detail based on the above-described embodiments, the present invention is not limited thereto, but may be changed and modified without departing from the technical scope and spirit of the present invention.

What is claimed is:

1. A system for managing an object-oriented database in response to a request issued from an application program, comprising:

a database for storing therein both of a class having a definition of an object and an object generated from said class;

means for generating a class and a plurality of attributes based on class definition information and attribute definition information, which are designated by the application program;

means for generating an object to store an attribute value corresponding to said class definition information in accordance with said class definition information in response to any one of such facts that the request issued from the application program is related to a normal attribute, and to a clustering attribute, said object generating means including a storage control unit for storing the attribute value related to said normal attribute into one storage unit area of said database and for storing the attribute value related to said clustering attribute into another storage unit area of said database; and means for acquiring information corresponding to an identifier of an attribute required by the application program from any one of said one storage unit area and said another storage unit area, and for storing the acquired information into a memory area.

2. An object-oriented database managing system as claimed in claim 1 wherein:

said object generating means includes means for setting to said object, a storage record identifier for storing an attribute value in accordance with definition information of a clustering information class supplied from the application program.

3. An object-oriented database managing system as claimed in claim 1 wherein:

said storage means ensures a memory region for storing said information corresponding to said identifier of said attribute requested from said application program in response to a data acquisition request issued from the application program.

4. An object-oriented database managing system as claimed in claim 3 wherein:

said object generating means includes means for setting to said object, a storage record identifier for storing an attribute value in accordance with the definition information of a clustering information class supplied from the application program.

5. An object-oriented database managing system as claimed in claim 1 wherein:

said class designated and defined by said application program contains a clustering identifier of a class to be clustered; and said clustering attribute contains a name of said class, an identifier of said class, an area identifier for indicating a storage area of said database for storing data to an attribute generated from said class, and also a class sort for indicating that said class is information related to the clustering.

6. An object-oriented database managing system as claimed in claim 1 wherein:

an attribute value corresponding to said identifier of said attribute required from said application program is stored in said another storage unit area.

7. An object-oriented database managing system as claimed in claim 6 wherein:

said object generating means includes means for setting to said object, a storage record identifier for storing an attribute value in accordance with definition information of a clustering information class supplied from the application program.

8. An object-oriented database managing system as claimed in claim 6 wherein:

said storage means ensures a memory region for storing said information corresponding to said identifier of said attribute requested from said application program in response to a data acquisition request issued from the application program.

9. A method for managing an object-oriented database in accordance with a request issued from an application program, comprising the steps of:

defining a class having a definition of an object;

generating an object based on said class;

generating a class and a plurality of attributes based upon class definition information and attribute definition information, which are designated by the application program;

generating an object to store an attribute value corresponding to said class definition information in accordance with said class definition information in response to any one of such facts that the request issued from the application program is related to the normal attribute, and to a clustering attribute, said object generating step storing the attribute value related to said normal attribute into one storage unit area of said database and also storing the attribute value related to said clustering attribute into another storage unit area of said database; and acquiring information corresponding to an identifier of an attribute required by the application program from any one of said one storage unit area and said another storage unit area, thereby storing the acquired information into a memory area.

10. An object-oriented database managing method as claimed in claim 9 wherein:

said object generating step includes a step for setting to said object, a storage record identifier for storing an attribute value in accordance with definition information of a clustering information class supplied from the application program.

11. An object-oriented database managing method as claimed in claim 10 wherein:

in said storage step, a memory region is ensured which stores said information corresponding to said identifier of said attribute requested from said application program in response to a data acquisition request issued from the application program.

12. An object-oriented database managing method as claimed in claim 11 wherein:

in said object generating step, a storage record identifier for storing an attribute value in accordance with the definition information of a clustering information class supplied from the application program is set to said object.

13. An object-oriented database managing method as claimed in claim 9 wherein:

said class designated and defined by said application program contains a clustering identifier of a class to be clustered; and said clustering attribute contains a name of said class, an identifier of said class, an area identifier for indicating a storage area of said database for storing data to an attribute generated from said class, and also a class sort for indicating that said class is information related to the clustering.

14. An object-oriented database managing method as claimed in claim 9 wherein:

an attribute value corresponding to said identifier of said attribute required from said application program is stored in said another storage unit area.

15. An object-oriented database managing method as claimed in claim 14 wherein:

in said object generating step, a storage record identifier for storing an attribute value in accordance with the definition information of a clustering information class supplied from the application program is set to said object.

16. An object-oriented database managing method as claimed in claim 14 wherein:

in said storage step, a memory region is ensured which stores said information corresponding to said identifier of said attribute requested from said application program in response to a data acquisition request issued from the application program.

* * * * *